May 6, 1969

T. J. O'BRIEN 3,442,350

SILENCER WITH MEANS FOR SPRAYING SHEETS OF SOAPY
WATER AND AIR AROUND EXHAUST STREAM

Filed July 1, 1968

INVENTOR

THOMAS J. O'BRIEN

BY *Harvey J. Boyd*

ATTORNEY

United States Patent Office 3,442,350
Patented May 6, 1969

3,442,350
SILENCER WITH MEANS FOR SPRAYING SHEETS OF SOAPY WATER AND AIR AROUND EXHAUST STREAM
Thomas J. O'Brien, 3202 Moylan Drive, Bowie, Md. 20715
Filed July 1, 1968, Ser. No. 741,761
Int. Cl. F01n 1/04
4 Claims

ABSTRACT OF THE DISCLOSURE

The disclosure describes a noise suppressor having an inner annular segment contained within an outer one, the outer one supplied with soapy water and the inner one with air, the mixture being blown out through holes in the outer segment to form a noise-suppressing sheet. The sheet is guided by skirts so as to be spaced from the exhaust gases.

---

The invention described herein may be manufactured and used by or for the Government for governmental purposes without the payment to me of any royalty thereon.

Background of the invention

This invention relates to a device for creating a sheet of soap bubbles for the suppression of the noise of an engine's exhaust, and is particularly designed for use in turbine powered aircraft. As the number and size of turbine powered aircraft are increased, the attendant level of engine noise becomes more and more annoying. Unless that noise is suppressed before it reaches the ground, the size and power of aircraft are limited to that which produces noise acceptable to the general public. Although air bubbles in water have been used to suppress the noise of water vehicles, as for example in U.S. Patent No. 3,084,-651, issued to R. Parmenter on Apr. 9, 1963, no such devices have been developed for use with the exhaust of aircraft engines.

Summary of the invention

This invention provides an exhaust noise suppressor which allows larger and more powerful aircraft engines to be used. More specifically, I have discovered that such noise is effectively suppressed by a sheet of soap bubbles created by means for introducing soap water into an annular segment positioned adjacent to but spaced from the end of the exhaust outlet, means for constricting the flow of water to a sheet within the segment, means for introducing air into the segment at the point where the water is in sheet form, and means in the segment for forming the bubble sheet in diverging form and spaced from the exhaust fumes of the engine.

Accordingly, it is an object of this invention to provide apparatus for the production of a bubble sheet which suppresses the noise of an engine's exhaust.

It is a further object to provide apparatus of the above character which will insure that the bubble sheet has sufficient short-term stability even though it will eventually dissipate.

Other objects and advantages of the invention will become apparent upon reference to the following drawings and detailed discussion.

Description of the preferred embodiments

Figure 1:
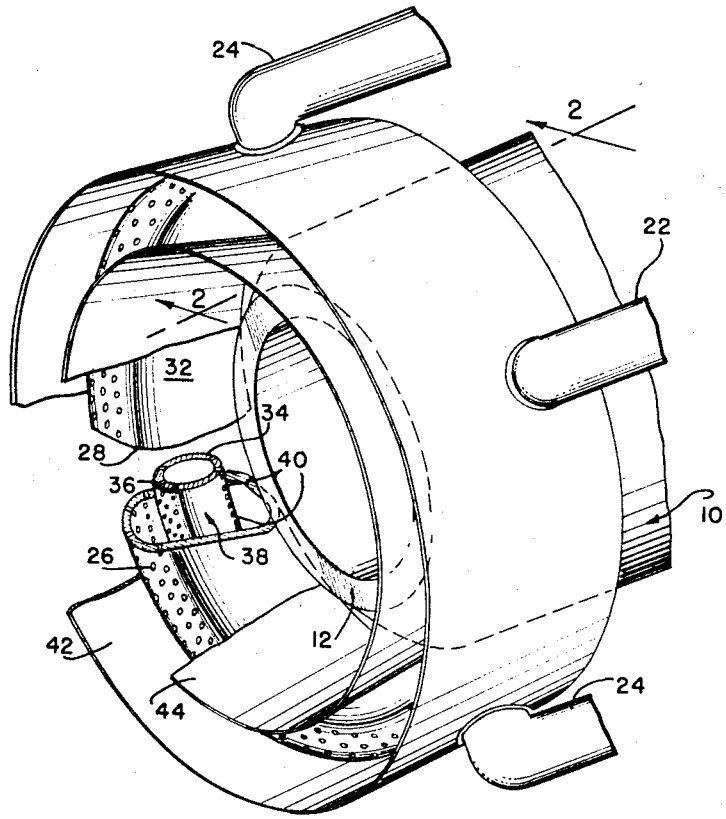
FIG. 1 is a perspective of the invention partially broken away to illustrate the interior of the device.

The invention is utilized in conjunction with an engine exhaust 10 such as is used with high-speed airplanes. The noise suppressor is positioned at the end of and surrounding the exhaust outlet 12 so that the axis of the suppressor coincides with the axis of the engine exhaust (FIG. 1).

Figure 2:
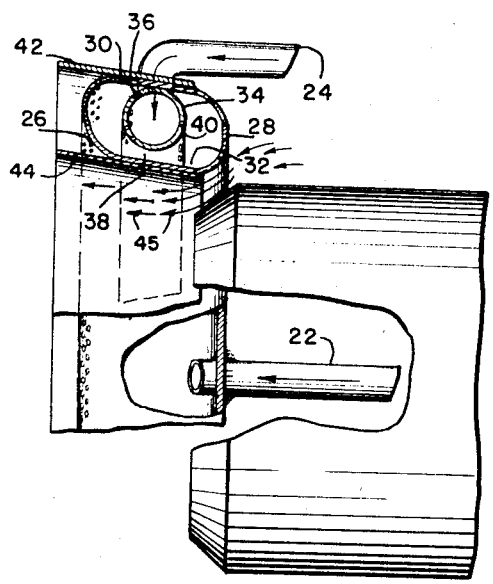
FIG. 2 is a partial section taken along the plane passing through line 2—2 of FIG. 1 parallel to the axis of the engine exhaust, a portion being broken away to illustrate the interior of the device.

In accordance with the invention, to provide a bubble sheet around an engine exhaust of the type illustrated, an annular segment having another annular segment within it has fed into it soapy water via pipes 22 and air into the inner segment via pipes 24, the resulting mixture being blown out in the form of a conical bubble sheet through holes 26 which project away from the exhaust outlet 12. As illustrated in the embodiment of FIGS. 1 and 2, the annular segment is a torus 28 having two side walls 30 and 32, the inner segment is a torus 34 with a set of openings or holes 36 also projecting away from the exhaust outlet 12, two pipes 22 are welded to the front of the torus 28 to bring in the soapy water at that point, and two pipes 24 pass through the outer wall 30 and are welded to the torus 34 to bring in the air.

In accordance with one aspect of the invention, to constrict the soapy water which has been supplied inside the outer torus 28 by the pipes 22 into a sheet form prior to the introduction of air through the holes 36, the inner torus and the outer torus are provided with different shaped cross-sections. Thus, the inner torus 34 has a circular cross-section while the outer torus 28 has a non-circular cross-section, so that the soapy water is forced through the narrow passage 38 and around the torus 34 at the point where the air is blown in streams into the water through the holes 36. Of course, the same result could be obtained by reversing the cross-sectional shapes of the inner and the outer tori.

In accordance with another aspect of the invention, to insure that the bubble sheet ejected through the holes 26 has the proper constitution, the water injected by the pipes 22 must have a suitable bubble-producing additive, which may be 1 part of soap or detergent to every 400 parts of water, and the air must be fed through the pipes 24 at the proper ratio of air to water, which may be eleven or more to one. In addition, the openings 26 are sized and spaced to fix the diameter and number of bubbles per linear inch so as to control the constitution of the sheet, which may be about 40 bubbles per linear inch. The holes 36 can be of the same size as the holes 26. The width of the bubble sheet produced can be varied, depending on the amount of noise suppression desired. The thicker the sheet, the more the suppression. To produce a typical thickness of one to two inches, the width of the torus 28 as measured between the side walls 30 and 32 at the termination of the holes 26 is between one and two inches.

To insure that an unbroken bubble sheet is generated, the bubbles must be ejected out of the suppressor at a rate comparable to the airspeed of the airplane. To maintain the bubble sheet, air must be supplied by the pipes 24 and soapy water by the pipes 22 in quantities proportional to volumetric flow rate of the bubble sheet and to the proper ratio of air to water.

In accordance with still another aspect of the invention, to prevent a build-up of air pressure just outside of holes 36 sufficient to block the flow of soapy water through the gap 38, a second set of openings in the form of a row of holes 40 is provided in the side of the torus 34 which projects toward the exhaust outlet 12. Thus some bubbles are formed even prior to the injection of the main air streams from the holes 36. In addition, to provide a source of bubbles having a diameter considerably less than those formed by the holes 26, the holes 40 can be so sized.

In accordance with yet another aspect of the invention, to orientate the direction of the bubble sheet ejected out of the holes 26 at least temporarily with the exhaust gases from the engine, the walls 30 and 32 generally diverge at an angle of about 8 degrees away from the axis of the engine exhaust as they slope away from the exhaust outlet. In addition, to stabilize the thickness of initial flow of the bubble sheet skirts 42 and 44 are welded to those respective sides at about the same angle. In addition, the exhaust gases flowing from exhaust outlet 12 through the center of torus 28 cause torus 28 to act as an ejector for inducing a cooling, outside air flow between inner skirt 44 and the exhaust gases, as indicated by the arrows 45. The result is a bubble sheet which is initially separated from the hot streaming gases exhausted from the outlet 12.

Figure 3:
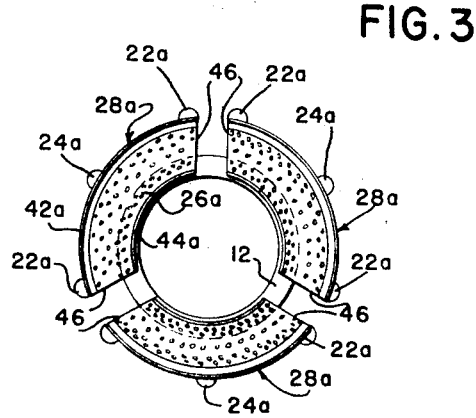
FIG. 3 is an end elevation illustrating another embodiment of the invention.

In FIG. 3, an alternate embodiment of the invention is illustrated with parts corresponding to those previously described having the same reference numerals to which the distinguishing suffix "a" has been added. Thus, instead of having two tori coaxial with the engine exhaust which are both supplied with two pipes, three sets of annular segments 28a are spaced around the exhauset outlet 12, each containing an inner annular segment (not shown). The shapes, holes, and spacial relations of the inner and outer segments are as described for the previous embodiment, except that the ends 46 of each segment are closed off. The soapy water is injejcted into each outer segment 28a by two pipes 22a, while the air is injected into the inner annular segment by a pipe 24a. Skirts 42a and 44a are positioned as in the previous embodiment, except they are broken into three sets to correspond with the three segments 28a. The result is a bubble sheet ejected from the holes 26a in the same manner as the previous embodiment, except that it initially has three small gaps due to the spacing of the ends 46.

I claim:
1. An exhaust noise suppressor for use in conjunction with the outlet of an engine exhaust and designed to produce a bubble sheet, said suppressor comprising:
 (a) an annular segment positioned adjacent to but spaced from the outlet of the engine exhaust;
 (b) means for introducing soapy water into said segment;
 (c) means for constricting the flow of the water within said segment to form a sheet;
 (d) means for introducing streams of air into said segment at the point where the water is in sheet form; and
 (e) means in said segment for forming a diverging sheet of bubbles spaced from the exhaust gases of the engine.

2. The exhaust noise suppressor as defined in claim 1 wherein:
 (a) said annular segment has a non-circular cross-section; and
 (b) said constricting means include a second annular segment within said segment, said second segment having a circular cross-section.

3. The exahust noise suppressor as defined in claim 1 wherein said air-introducing means includes a second annular segment having:
 (a) a first set of openings projecting away from the exhaust outlet; and
 (b) a second set of openings of a different size than said first set, said second set projecting toward the exhaust outlet.

4. The exhaust noise suppressor as defined in claim 1 wherein:
 (a) said segment has two sides both of which generally diverge from the axis of the engine exhaust as they slope away from the exhaust outlet;
 (b) said forming means includes a skirt on both of said diverging sides of said segment.

References Cited

UNITED STATES PATENTS

| | | | |
|---|---|---|---|
| 2,389,059 | 11/1945 | Kurth | 181—33 |
| 2,927,423 | 3/1960 | Wisniowski | 181—33 |
| 2,954,750 | 10/1960 | Crump et al. | 181—33 |
| 3,084,651 | 4/1963 | Parmenter | 181—33 |

ROBERT S. WARD, Jr., *Primary Examiner.*

U.S. Cl. X.R.

181—52